US005825784A

United States Patent [19]
Spaderna et al.

[11] Patent Number: 5,825,784
[45] Date of Patent: Oct. 20, 1998

[54] TESTING AND DIAGNOSTIC MECHANISM

[75] Inventors: Dieter Spaderna, Portland, Oreg.; Raed Sabha, Vancouver, Wash.

[73] Assignees: Sharp Microelectronics Technology, Inc., Camas, Wash.; Sharp Kabushiki Kaisha, Osaka, Japan

[21] Appl. No.: 932,151

[22] Filed: Sep. 17, 1997

Related U.S. Application Data

[63] Continuation of Ser. No. 620,269, Mar. 22, 1996.

[51] Int. Cl.$^6$ ...................................................... G06F 11/00
[52] U.S. Cl. ........................................... 371/22.1; 395/290
[58] Field of Search ................................. 371/22.1, 22.5; 395/856, 285, 287–290, 402, 183.06, 182.11, 183.19, 183.15

[56] References Cited

U.S. PATENT DOCUMENTS

| | | | |
|---|---|---|---|
| 4,010,448 | 3/1977 | Bennett et al. ........................ | 340/172.5 |
| 4,245,307 | 1/1981 | Kapeghian et al. .................... | 364/200 |
| 5,212,775 | 5/1993 | Bikowsky et al. ..................... | 395/275 |
| 5,251,304 | 10/1993 | Sibigtroth et al. .................... | 395/375 |
| 5,408,639 | 4/1995 | Gulick et al. ......................... | 395/550 |
| 5,525,971 | 6/1996 | Flynn ................................. | 340/825.06 |
| 5,537,355 | 7/1996 | Banerjee et al. ....................... | 365/201 |

FOREIGN PATENT DOCUMENTS

| | | |
|---|---|---|
| 0 636 976 A1 | 7/1994 | European Pat. Off. . |
| 0 652 516 A1 | 10/1994 | European Pat. Off. . |
| 62006488 | 1/1987 | Japan . |

OTHER PUBLICATIONS

"The ARM RISC Chip, A Programmer's Guide" Alex van Someren & Carol Atack, 1993, pp. 21–35, 121–163, Addison–Wesley Publishing Company.

"ARM7DI Data Sheet" Advanced RISC Machines Ltd. (ARM), Dec., 1994, pp. ii, 15–18, 81–90, 119–129.

"ARM Software Development Toolkit 2.0" Advanced RISC Machines Ltd. (ARM), prior to Jan. 1, 1996, 3 pages.

"An Introduction to Thumb" Advanced RISC Machines Ltd. (ARM), Mar. 1995, pp. 9–14.

*Primary Examiner*—Robert W. Beausoliel, Jr.
*Assistant Examiner*—Nadeem Iqbal
*Attorney, Agent, or Firm*—David C. Ripma; Gerald W. Maliszewski

[57] ABSTRACT

A testing and diagnostic mechanism includes an external bus master allows access of virtually all internal registers on an integrated circuit, and allows the on-chip SRAM/DRAM controllers to access external memory.

6 Claims, 2 Drawing Sheets

TESTING AND DIAGNOSTIC MECHANISM

CROSS-REFERENCE TO RELATED APPLICATIONS

The present application is a continuation of application Ser. No. 08/620,269, filed Mar. 22, 1996, now abandoned, entitled "Testing and Diagnostic Mechanism," invented by Dieter Spaderna and Raed Sabha.

FIELD OF THE INVENTION

The invention relates to integrated circuits, and specifically to a testing and diagnostic mechanism for use in an integrated circuit which includes a reduced instruction set computer (RISC) central processing unit (CPU) which is intended for use in portable devices which incorporates a block of on-chip memory which may be used as a cache or as RAM.

BACKGROUND OF THE INVENTION

Portable devices include electronic instruments such as personal information manager, cellular telephones, digital cameras, hand-held games, bar-code scanners, medical equipment, electronic instrumentation, and navigation systems, specifically global positioning satellite navigation systems.

To be commercially successful, portable devices require integrated circuits which are low in cost, have low power requirements to insure long battery life, and have high standards of performance to insure that their output is accurate and usable. Additionally, the interface between the integrated circuit and the remainder of the portable device must be of a plug-and-play design so that a single type of integrated circuit may be used with a number of portable devices. Part of such flexibility is that the designer of a portable device must be able to easily incorporate the IC into the device as an off-the-shelf component, which does not require any internal modification to be used in a variety of applications.

The "computing power" found in integrated circuit CPUs, such as the Intel 30*86 and Pentium® series chips, and the Motorola 68000 series chips, has increased significantly over the last few years. At the same time, the size of such chips has grown significantly, as has their power requirements. Such chips are designated as conventional instruction set computers (CISC) and have come to require significant blocks of associated random access memory (RAM) while the applications that have been written to run on computers containing these chips have grown, seemingly without limit, requiring vast amounts of hard drive space. Such CISC devices are not easily usable with portable devices due to their power requirements and size.

Reduced instruction set computers (RISC) were originally used in high-end graphics applications, and in CAE/CAD work stations. The RISC architecture, however, enables an IC to have a significantly smaller die size, because the smaller instruction set of the RISC technology requires fewer transistors to implement, which leads to simpler designs which consequently take less time to complete and to debug. Additionally, smaller chips having shorter signal paths mean that each instruction cycle is of a shorter duration. The relative size of a RISC CPU is significantly smaller than a CISC CPU, for instance, the Intel 386 SL chip is approximately 170 mm$^2$, while a RISC chip having similar computational abilities is slightly more than 5 mm$^2$.

The small size of RISC-based CPUs makes the RISC architecture ideal for "system-on-chip" (SOC) applications, wherein the CPU and a number of other structures are located on a single chip. Such a SOC architecture may result in a chip that is still considerably smaller than a CISC CPU, but which contains all of the computational and control structures on a single Integrated circuit. A SOC architecture will generally include the RISC CPU and some type of local RAM and/or data cache. Additionally, the chip may include internal and external bus controllers, various types of communication ports, an interrupt controller, and pulse width modulator, various configuration registers, various timer/counter structures, and some type of output controller, such as an LCD controller. Such a structure may be configured in a 32-bit architecture, with associated peripherals integrated onto the chip, which integration allows the designer of the portable device incorporating the chip to reduce the development cycle and accelerate the product introduction to market. The chip structure may have an external 16-bit data bus with an integrated, programmable bus controller capable of supporting 8 or 16-bit SRAM, DRAM, EPROM and/or memory devices, which do not require additional buffers in order to function with the integrated circuit. The chip may be operated at either 3.3 volts or 5 volts, which will require between 100 mW and 350 mW respectively.

By combining a number of peripherals on the chip, and providing an internal bus amongst the CPU and peripherals, it is possible to conduct a number of operations on chip, while simultaneously controlling off-chip operations, such as memory stores and retrieves.

The integrated circuit may include a memory interface which provides multiple programmable chip enables, allowing users to set wait states and memory width, 8 or 16-bits wide. The integrated circuit provides for address decoding and DRAM control logic, which allows an external bus master to perform data transfers without requiring external address decoding or external DRAM controllers. In the case where sequential accesses are being used, the integrated circuit automatically increments the initial memory address supplied by the external bus master, thereby speeding transfers.

The invention of this application is a testing and diagnostic mechanism which includes an external bus master controller, and which allows access of virtually all internal registers on the integrated circuit, and which allows the on-chip SRAM/DRAM controllers to access external memory.

These and other objects and advantages of the invention will become more fully apparent as the description which follows is read in connection with the drawings.

BEST MODE OF PRACTICING THE INVENTION

Figure 1:
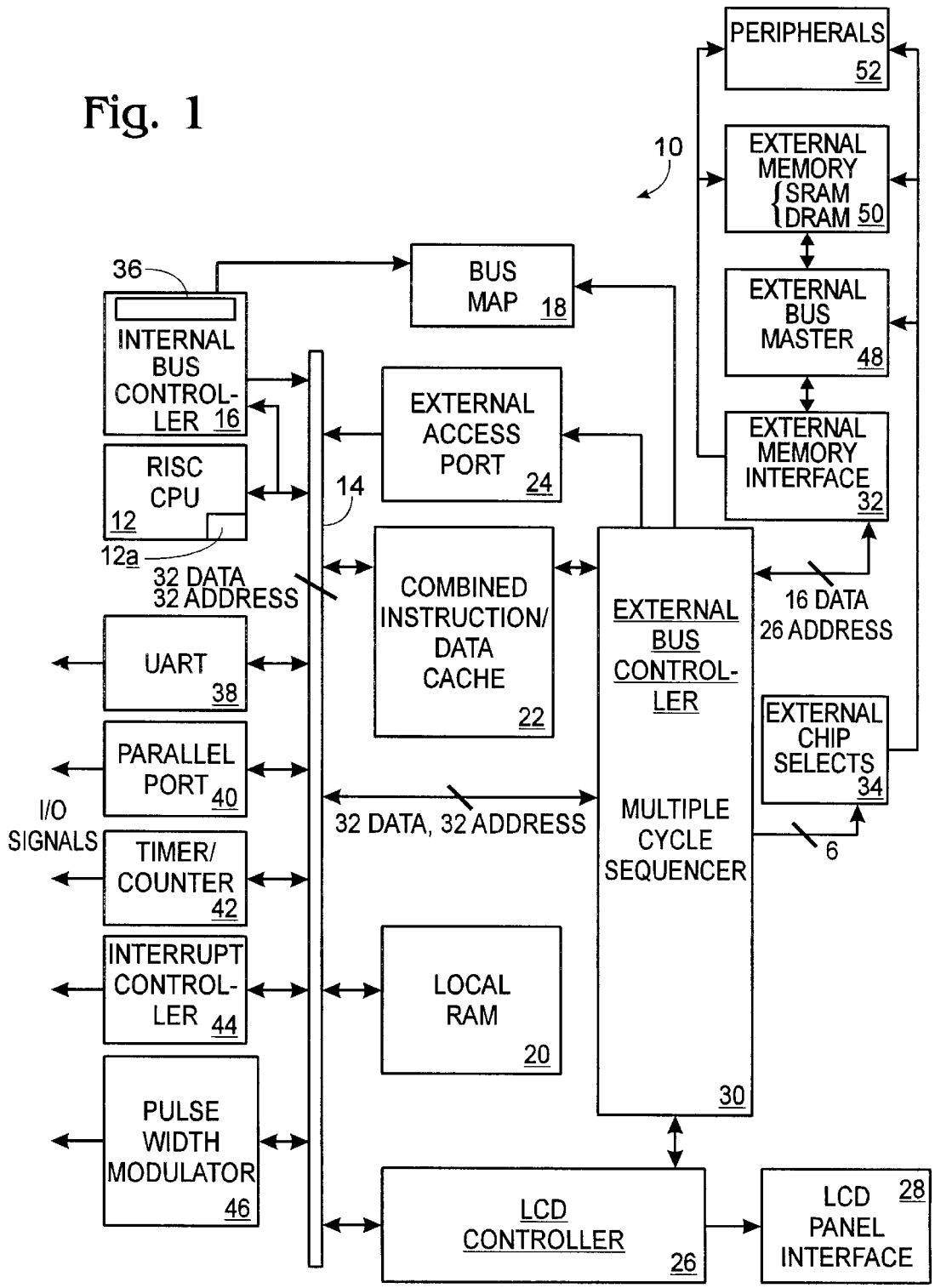
FIG. 1 is block diagram of the system on chip structure of the invention.

Referring initially to FIG. 1, a system on chip (SOC) structure of the invention is depicted generally at 10. IC 10 includes a 32-bit RISC CPU 12 which is connected to a 32-bit internal bus 14. CPU 12 is directly connected to internal bus controller 16, which in turn is connected to bus 14 and to a bus map 18. IC 10 further includes a local RAM (SRAM) 20, a combined instruction/data cache 22, and an external access port 24. In the preferred embodiment, IC 10 is intended to connect to a liquid crystal display (LCD) and to that end, includes a LCD controller 26 which is connected to an LCD panel interface 28. An external bus controller 30 is provided and is connected to a 26-bit external memory interface 32 and external chip selects 34.

A number of configuration registers 36 are provided, whose functions will be described later herein. In the preferred embodiment, configuration registers 36 are located in internal bus controller 16. A number of internal "peripherals" reside on integrated circuit 10, and are connected to internal bus 14, and include a universal asynchronous receiver/transmitter (UART) 38, a parallel port 40, a timer/counter 42, an interrupt controller 44, and a pulse width modulator (PWM) 46.

An external bus master 48, also referred to herein as an external device, is connected to external memory interface 32, external chip selects 34 and to an external memory 50. External memory 50 may include both SRAM and DRAM portions thereto. Peripheral devices, collectively labeled 52, are connected to external memory interface 32 and external chip selects 34. External memory interface 32 and external chip selects 34 are, in the preferred embodiment, a part of external bus controller 30. It will be appreciated by those of skill in the art that those objects identified by reference number 12 through 46 form parts of integrated circuit 10, while objects having reference numbers greater than 46 are off-chip devices.

Figure 2:
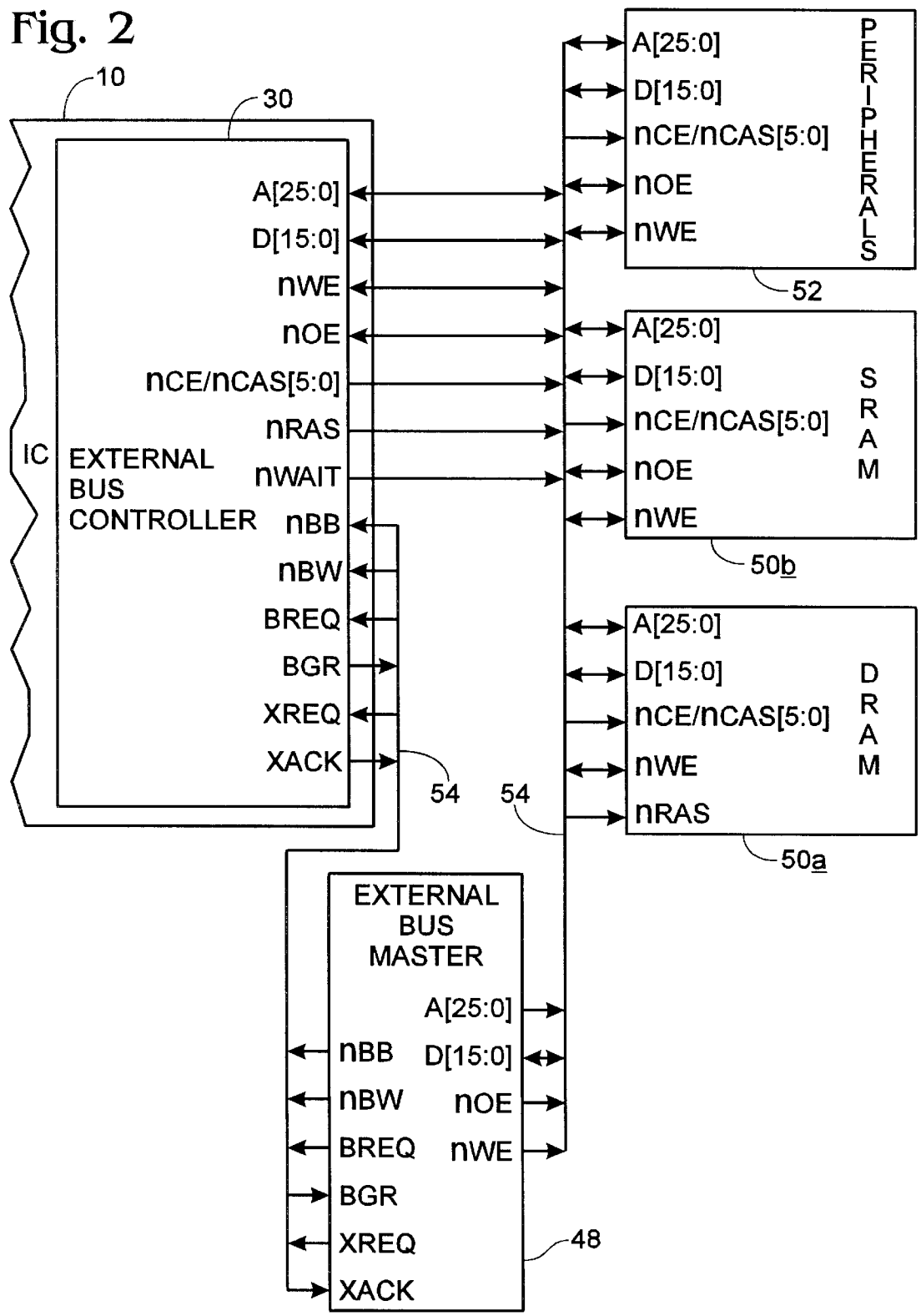
FIG. 2 is a block diagram of the pin connections between the integrated circuit of the invention and the off-chip devices connected thereto.

In the preferred embodiment, IC 10 is constructed in an 160 pin Thin Quad Flat Pack (TQFP) assembly. Referring now to FIG. 2, of particular interest in the instant invention are those pins which connect to external bus master 48 and which are designated bus master request (BREQ) for transmitting a request signal, bus master grant (BGR) for transmitting a grant signal, transfer request (XREQ), and transfer acknowledge (XACK). Signal flow is represented by arrowed lines connecting IC 10, external bus master 48, DRAM 50a, SRAM 50b and peripherals 52. It should be appreciated that external memory interface 32 and external chip selects 34 are physically located in external bus controller 30 in the preferred embodiment. Pins BREQ and XREQ are referred to herein as a request mechanism, while pins BGR and XACK are referred to herein as a grant mechanism. Data and/or instructions will then pass between IC 10 and the external memory and peripherals over buses for data, addresses and control functions, collectively labeled as bus 54.

To describe the foregoing in more detail, and now referring to FIGS. 1 and 2, CPU 12 allows external bus master 48 to take control of external memory interface 32 as well as use on-chip SRAM/DRAM controllers, generally located in internal bus controller 16, to transfer data. The previously identified four dedicated signals are used to accomplish control of external interface 32. It should be understood that external bus master 48 must provide its own chip enables and CAS/RAS (column address select/row address select) signals for external memory 50, or, it must use the XREQ/XACK to access the on-chip control signals using the SRAM/DRAM controllers located in internal bus controller 16. External bus master 48 requests control of external memory interface 32 by asserting BREQ pin high. When CPU 12 completes any current bus operation, external interface 32 will be released to external bus master 48 and the BGR pin will be driven high. After external bus master 48 has completed the interrogation or transfer of data, it asserts BREQ pin low and CPU 12 asserts BGR pin low, which indicates that the external memory interface has been released by external bus controller 48 and that the external memory interface in now under the control of CPU 12.

When CPU 12 detects that the BREQ pin is high, it completes its current bus operation and asserts BGR high, which allows external bus master 48 to take control of external interface 32. All of the on-chip components will be under control of external bus master 48, with the exception of CPU 12, which will be in an idle mode. So long as BGR is maintained high by CPU 12, external bus master 48 will have control of external memory interface 32. It should be understood that although CPU 12 is in an idle mode, IC 10 will continue to refresh the DRAM memory banks in accordance with its programming, also referred to herein as a refresh mechanism.

When external bus master 48 asserts the XREQ pin high, and assuming that BGR is also asserted high, external bus master 48 can access internal SRAM, cache, registers, DRAM controller and SRAM controller. External bus master 48 provides address, data, read/write access, and transfer size to IC 10, which uses its on-chip controllers to complete the transfer. External bus master 48 may also request IC 10 to keep track of the transfer address internally, in a memory map register located in internal bus controller 16, and specifically in one of the configurations registers 36 therein, thus eliminating the need to provide an external address beyond that required for the first transfer. This comprises what is referred to herein as a stop/start mechanism for placing CPU 12 in an idle mode while allowing external device 48 to access on-chip registers.

When IC 10 detects that XREQ pin is asserted high, it provides an acknowledgment signal in the form of asserting the XACK pin high, and latching the address, data, and controls in a configuration for access by external bus master 48. IC 10 may take control of external memory interface 32 by asserting BGR low, which blocks external bus master 48 from controlling IC 10. When the requested transfer is completed, IC 10 will drive XACK low, place data bus 54 in a read operation and continue to assert BGR low, so long as XREQ is high. When XREQ is driven low by external bus master 48, IC 10 will assert BGR high, thereby giving external bus master 48 control of interface 32. External bus master 48 may start another transfer by driving XREQ high, or by releasing bus 54, by driving BREQ low.

When IC 10 is under the control of external bus master 48, pins nOE, nWE, and nBW are in a high-impedance state, and drives nCE/nCAS and NRAS are inactive. As used herein, "n" preceding a pin means "not". nOE is the output enable for external memory and peripherals, and allows external memory and peripherals to drive the data bus. It is asserted low during a read operation and high during a write operation. When under the control of external bus master 48, it functions as the output enable for microcontroller 12a, which is embedded in CPU 12. nOE should be driven low during a read operation and high during a write operation by external bus master 48.

nWE is the write enable for external memory and peripherals. During a write operation, nWE is driven low, and it is driven high during a read operation. When under the control of external bus master 48, nWE should be driven low during write operation, and high during a read operation.

nCE/nCAS[5:0] provide the chip enable (CE)/column address select (CAS) allowing direct connection to standard external memory/peripheral devices. The pins act as an nCAS when interfacing to DRAM 50a and acts as an nCE when interfacing to SRAM 50b or peripheral devices 52. These pins are fully programmable by the system designer and may support byte enables. nCE is inactive when under the control of external bus master 48, while nCAS is active only during a refresh operation, provided that refresh is programmed into the circuit. NRAS provides row address selects allowing direct connection to DRAM 50a. nRAS is inactive when under the control of external bus master 48.

Pins designated as A[25:0] and D[15:0] are also in a high-impedance state when BGR is high. A[25:0] designates the twenty-six external address bus pins, and allows the embedded microcontroller to provide a 26-bit address to external memory and peripherals. When under the control of external bus master 48, a 26-bit address is sent to the embedded microcontroller. The high order 6 bits of the address are provided by an internal programmable register, located in configuration registers 36, giving the external bus master full access to the 32-bit address space.

D[15:0] designates the 16 pin external 16-bit data bus. When under the control of external bus master 48, input data is provided during a write access to embedded microcontroller 12a. nBW is the byte-wide access pin. CPU 12 provides a signal to external memory 50 and peripherals 52 which indicate the data size of the data transfer.

nBW may be used by an external address controller to generate extra chip/byte enables. When under the control of external bus master 48, the external bus master indicates the transfer size. Regardless of the active controller, CPU 12 or external bus master 48, a low asserted on pin nBW indicates a byte transfer, and a high asserted on pin nBW indicates a half word (16-bit transfer).

Pin nBB is the byte boot pin, which is used to select between 8-bit or 16-bit for the boot memory. When integrated circuit 10 is under the control of external bus master 48, external bus master 48 may provide its own address to microcontroller 12a on bus 54, in which case pin nBB is asserted low, and the high order 6 bits of the address are provided by an internal programmable register, identified as external bus master extension register (EBMER) and located in configuration registers 36. The external bus master 48 may also request the embedded microcontroller to keep track of the transfer address internally, in which case pin nBB should be asserted high. Microcontroller 12a adjusts the internal address as a function of the transfer size specified by external bus master 48 (nBW).

An external bus master register is used to expand addresses from external bus master 48 from 26-bits to 32-bits, thus allowing access to the entire address space provided by CPU 12. The internal 32-bit address is formed by adding an address extension of six bits to the 26-bit address on pins A[25:0]. Every time external bus master 48 provides an external address and nBB is asserted low, IC 10 captures the external address and forms a 32-bit internal address by combining the external bus master address and the address extension found in the external bus master extension register. Once the access is completed, IC 10 updates the new address according to the transfer size specified by external bus master 48 via nBW, to point to the next addressable location. If external bus master 48 is conducting sequential transfers, this structure allows IC 10 to supply future addresses. This can be done in subsequent transfers by asserting nBB high, in which case IC 10 ignores the external address and uses its own updated address instead. The address extension initially loaded into the external bus master extension register, has a logical value of "111111", allowing external bus master 48 to access the upper region of memory which includes system and peripheral registers, including the external bus master extension register, local SRAM, cache, and exception vectors. The external bus master extension register may be updated by a store command or by external bus master 48. Once the value in external bus master extension register is changed from "111111", the external bus master 48 is not allowed to access the external bus master register extension or the upper region of memory. The foregoing structures comprise what is referred to herein as an automatic address incrementation means.

Thus, it is possible for a user or designer to access the contents of any register on IC 10. This may be used for diagnostics, to determine the contents of a register at any particular point in the operation of IC 10, for programming, which allows a user to insert a specific address or data into a register, or for testing, which allows a designer to confirm that a specific register contains a given content at any point in time during operation.

This system may be particularly useful where IC 10 is used as part of a charge-coupled-device (CCD) camera, wherein pixel data is received from the CCD and is transferred into memory. Such transfer is generally too fast to be manageable by a conventional interrupt system. However, using the system disclosed herein, the starting address may be provided, either by IC 10 or from some external control, depending on the particular address map, which will allow IC 10 to transfer data at a high rate of speed from the CCD into memory.

We claim:

1. An integrated circuit mechanism for selectively accessing and controlling an integrated circuit having a RISC CPU and internal components controlled by the CPU including internal memory, internal SRAM and DRAM controllers, and an external interface including a bus for connection to external devices including external SRAM/DRAM memory, the integrated circuit mechanism system comprising:

an external bus master operatively connected via the external interface bus to the integrated circuit, such that said external bus master is operatively connected to internal components of the integrated circuit including the internal SRAM and DRAM controllers;

an internal bus controller in the integrated circuit including a memory map register for tracking transfer addresses, including addresses of transfers to and from external devices and external SRAM/DRAM memory;

request and grant mechanisms in the integrated circuit responsive to said external bus master for requesting the CPU to selectively enter an idle mode and grant control of the integrated circuit to said external bus master such that, when the external interface of the integrated circuit is granted to said external bus master, the external bus master has control of:

a) internal memory including read/write access to internal memory;

b) external devices including external SRAM/DRAM memory which are operatively connected to the integrated circuit via the external interface bus; and c) the internal SRAM and DRAM controllers; and said external bus master, when in control of the integrated circuit, having access to the internal SRAM and DRAM controllers for selectively controlling external SRAM/DRAM memory without the need for a separate SRAM/DRAM controller which is external to the integrated circuit.

2. An integrated circuit mechanism as in claim 1 in which the internal components of the integrated circuit further include internal registers and cache and, when said request and grant mechanisms in the integrated circuit respond to said external bus master and the CPU enters an idle mode wherein said external bus master has control of the integrated circuit, said external bus master also has control of, and read/write access to, the internal registers and cache in the integrated circuit.

3. An integrated circuit mechanism as in claim 1 in which the integrated circuit includes a refresh mechanism for refreshing DRAM, wherein said refresh mechanism continues to refresh DRAM when the CPU enters an idle mode and grants control of the integrated circuit to said external bus master.

4. An integrated circuit mechanism as in claim 1 in which external memory, including SRAM and DRAM, are operatively connected via said bus to said external bus master, said external memory being accessible by said external bus master using access control signals from the internal SRAM and DRAM controllers when the CPU is in an idle mode and has granted control of the integrated circuit to said external bus master.

5. An integrated circuit mechanism as in claim 1 in which said external bus master, when the CPU is in an idle mode and has granted control of the integrated circuit to said external bus master, selectively controls the function of enabling the internal SRAM and DRAM controllers to control external SRAM/DRAM memory, wherein said external bus master is able to selectively provide control signals to external SRAM/DRAM memory from outside the integrated circuit without using the internal SRAM and DRAM controllers.

6. An integrated circuit mechanism as in claim 1 in which the external interface bus to which said external bus master is operatively connected includes an address bus with a 26-bit capacity and the external addresses used by the external bus master are 26-bits, the internal addresses in the integrated circuit are 32-bits, and the integrated circuit includes an external bus master extension register for storing a 6-bit address extension which is combined with the 26-bit external addresses to form 32-bit internal addresses.

* * * * *